(12) United States Patent
Choi

(10) Patent No.: US 11,272,352 B2
(45) Date of Patent: Mar. 8, 2022

(54) DEVICE AND METHOD FOR SUPPORTING PLURALITY OF SIMS IN WIRELESS COMMUNICATION SYSTEM

(71) Applicant: Samsung Electronics Co., Ltd., Suwon-si (KR)

(72) Inventor: Woojun Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 3 days.

(21) Appl. No.: 16/766,489

(22) PCT Filed: Feb. 19, 2019

(86) PCT No.: PCT/KR2019/001959
§ 371 (c)(1),
(2) Date: May 22, 2020

(87) PCT Pub. No.: WO2019/164212
PCT Pub. Date: Aug. 29, 2019

(65) Prior Publication Data
US 2020/0382942 A1  Dec. 3, 2020

(30) Foreign Application Priority Data
Feb. 21, 2018  (KR) .................. 10-2018-0020317

(51) Int. Cl.
*H04W 8/18* (2009.01)
*H04W 76/12* (2018.01)
(Continued)

(52) U.S. Cl.
CPC ............. *H04W 8/183* (2013.01); *H04L 67/02* (2013.01); *H04W 12/02* (2013.01); *H04W 76/12* (2018.02); *H04W 88/06* (2013.01)

(58) Field of Classification Search
CPC ............ H04L 65/1016; H04L 65/1069; H04L 65/1096; H04L 67/02; H04M 2203/2011;
(Continued)

(56) References Cited

U.S. PATENT DOCUMENTS 9,002,337 B2  4/2015  Baek et al.
9,049,723 B2  6/2015  Dhanda et al.
(Continued)

FOREIGN PATENT DOCUMENTS

CN  102595521 A  7/2012
CN  103581856 A  2/2014
(Continued)

OTHER PUBLICATIONS

European Search Report dated Nov. 27, 2020; European Appln. No. 19756496.6-1213 / 3697112 PCT/KR2019001959.
(Continued)

*Primary Examiner* — Ronald Eisner
(74) *Attorney, Agent, or Firm* — Jefferson IP Law, LLP

(57) ABSTRACT

An electronic device is disclosed. In addition, various embodiments recognized through the specification are possible. The electronic device includes a communication module, a processor operatively connected with the communication module, and a memory operatively connected with the processor. The memory includes instructions, when executed by the processor, causing the processor to receive information associated with a SIM of another electronic device from the other electronic device via the communication module, receive a user input requesting a voice call for a first SIM of the other electronic device, and transmit a message requesting a voice call for a second SIM of the other electronic device to an IMS server via the communication module based on the information associated with the SIM.

8 Claims, 10 Drawing Sheets

(51) Int. Cl.
*H04L 67/02* (2022.01)
*H04W 12/02* (2009.01)
*H04W 88/06* (2009.01)

(58) Field of Classification Search
CPC ... H04M 2203/2033; H04M 2207/185; H04M 3/42246; H04W 12/02; H04W 12/126; H04W 12/40–45; H04W 4/14; H04W 4/16; H04W 76/00–18; H04W 8/183; H04W 80/10; H04W 88/06
See application file for complete search history.

(56) References Cited

U.S. PATENT DOCUMENTS

| | | | |
|---|---|---|---|
| 9,154,601 | B2 | 10/2015 | He et al. |
| 9,288,646 | B2 | 3/2016 | Ponukumati et al. |
| 9,374,697 | B2 | 6/2016 | Shih et al. |
| 9,769,867 | B2 | 9/2017 | Ramkumar et al. |
| 9,826,570 | B1* | 11/2017 | Gupta ................. H04L 65/1073 |
| 10,021,544 | B2 | 7/2018 | Shi et al. |
| 10,034,324 | B2 | 7/2018 | Ramkumar et al. |
| 10,136,457 | B2 | 11/2018 | Yoo et al. |
| 10,231,154 | B2 | 3/2019 | Ponukumati et al. |
| 2012/0178500 | A1* | 7/2012 | Hwang ................. H04W 8/183 455/558 |
| 2013/0150036 | A1 | 6/2013 | Pattaswamy et al. |
| 2014/0273974 | A1 | 9/2014 | Varghese et al. |
| 2014/0341184 | A1* | 11/2014 | Dhanda .................... H04L 5/12 370/331 |
| 2016/0219421 | A1 | 7/2016 | Shi et al. |

FOREIGN PATENT DOCUMENTS

| | | |
|---|---|---|
| CN | 104980905 A | 10/2015 |
| CN | 105580431 A | 5/2016 |
| CN | 106231654 A | 12/2016 |
| CN | 106231690 A | 12/2016 |
| CN | 107484153 A | 12/2017 |
| KR | 10-2011-0036464 A | 4/2011 |
| KR | 10-2015-0131236 A | 11/2015 |
| KR | 10-2016-0005782 A | 1/2016 |
| KR | 10-2016-0033138 A | 3/2016 |
| KR | 10-2017-0141006 A | 12/2017 |
| WO | 2017/164671 A1 | 9/2017 |

OTHER PUBLICATIONS

3GPP; 3rd Generation Partnership Project; Technical Specification Group Core Network and Terminals; IP multimedia call control protocol based on Session Initiation Protocol (SIP) and Session Description Protocol (SDP); Stage 3 (Release 11); 3GPP TS 24.229; V11.0.0; Jun. 2011; Valbonne, France.
Chinese Office Action with English translation dated Aug. 27, 2021; Chinese Appln. No. 201980014419.3.
Korean Office Action with English translation dated Sep. 23, 2021; Korean Appln. No. 10-2018-0020317.

* cited by examiner

DEVICE AND METHOD FOR SUPPORTING PLURALITY OF SIMS IN WIRELESS COMMUNICATION SYSTEM

TECHNICAL FIELD

Embodiments disclosed in the disclosure relate to an apparatus and method for supporting a plurality of subscriber identification modules (SIMs) in a wireless communication system.

BACKGROUND ART

To improve sound quality and efficiency of a voice call over a circuit switched (CS) network, a voice over internet protocol (VoIP) technology based on an internet protocol (IP) has been widely used. Unlike a CS mode, voices may be exchanged through data packets in the VoIP technology. The VoIP technology is applicable to various network platforms based on a packet data network. For example, for VoIP in long term evolution (LTE) wireless communication, voice over LTE (VoLTE) may be used.

An electronic device supporting a voice call function may include an identification module to provide a user with various services such as user authentication, billing, and a security function. The identification module may include, for example, a subscriber identification module (SIM). The electronic device may include a single SIM or may include a plurality of SIMs such as a dual SIM.

DISCLOSURE

Technical Problem

When an electronic device supports a dual SIM, for example, a first SIM may support a CS mode and a second SIM may support a VoIP technology. For another example, both the first SIM and the second SIM may support the VoIP technology. A technology where both the first SIM and the second SIM use VoLTE may be referred to as dual VoLTE. In the dual VoLTE technology, the first SIM and the second SIM may use the same radio frequency (RF) resource.

Because an RF resource is used during a voice call using the first SIM when the electronic device supports the dual SIM and the dual VoLTE, although another electronic device requests a voice call using the second SIM, there may be a problem in which it is impossible for the electronic device to receive a request message.

In various embodiments of the disclosure, as an electronic device transmits information associated with a SIM which is in use by the electronic device to another electronic device, the other electronic device may request a voice call through the SIM which is in use by the electronic device among a plurality of SIMs.

In various embodiments of the disclosure, as the information associated with the SIM includes data indicating whether to release a phone number corresponding to the SIM, the electronic device may fail to provide another user with the phone number for the SIM when a user does not want to release the phone number.

Technical Solution

In accordance with an aspect of the disclosure, an electronic device is provided. The electronic device may include a communication module, a processor operatively connected with the communication module, and a memory operatively connected with the processor. The memory may include instructions, when executed by the processor, causing the processor to receive information associated with a subscriber identification module (SIM) of another electronic device from the other electronic device via the communication module, receive a user input requesting a voice call for a first SIM of the other electronic device, and transmit a message requesting a voice call for a second SIM of the other electronic device to an internet protocol multimedia subsystem (IMS) server via the communication module based on the information associated with the SIM.

In accordance with another aspect of the disclosure, an electronic device is provided. The electronic device may include a first SIM, a second SIM, a communication module, a processor operatively connected with the first SIM, the second SIM, and the communication module, and a memory operatively connected with the processor. The memory may include instructions, when executed by the processor, causing the processor to receive a user input changing from the first SIM to the second SIM, transmit information associated with the second SIM to another electronic device via the communication module, and receive a message requesting a voice call for the second SIM from an IMS server via the communication module.

In accordance with another aspect of the disclosure, a method of an electronic device is provided. The method may include receiving information associated with a SIM of another electronic device from the other electronic device, receiving a user input requesting a voice call for a first SIM of the other electronic device, and transmitting a message requesting a voice call for a second SIM of the other electronic device to an IMS server based on the information associated with the SIM.

Advantageous Effects

According to various embodiments disclosed in the disclosure, the electronic device may transmit information about a changed SIM to another electronic device, thus receiving a voice call request message from the other electronic device during a voice call in a dual SIM and dual VoLTE environment.

According to various embodiments disclosed in the disclosure, the electronic device may set whether to release information associated with a SIM, thus selectively providing a user of another electronic device with information about a plurality of SIMs.

In addition, various effects ascertained directly or indirectly through the present disclosure may be provided.

With regard to description of drawings, the same or similar denotations may be used for the same or similar components.

MODE FOR INVENTION

Hereinafter, various embodiments of the disclosure may be described with reference to the accompanying drawings. However, it should be understood that this is not intended to limit the disclosure to specific implementation forms and includes various modifications, equivalents, and/or alternatives of embodiments of the disclosure.

Figure 1:
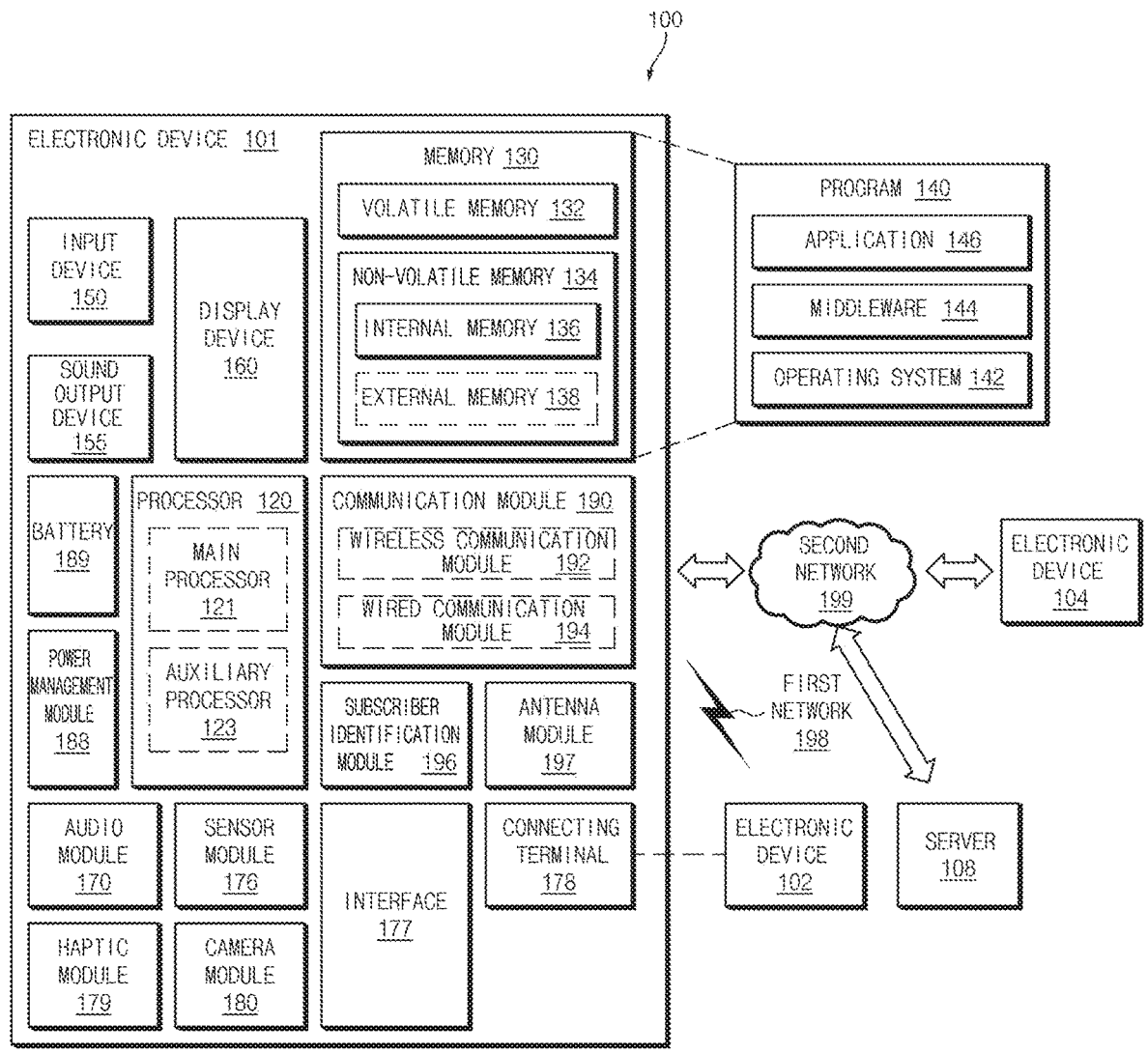
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
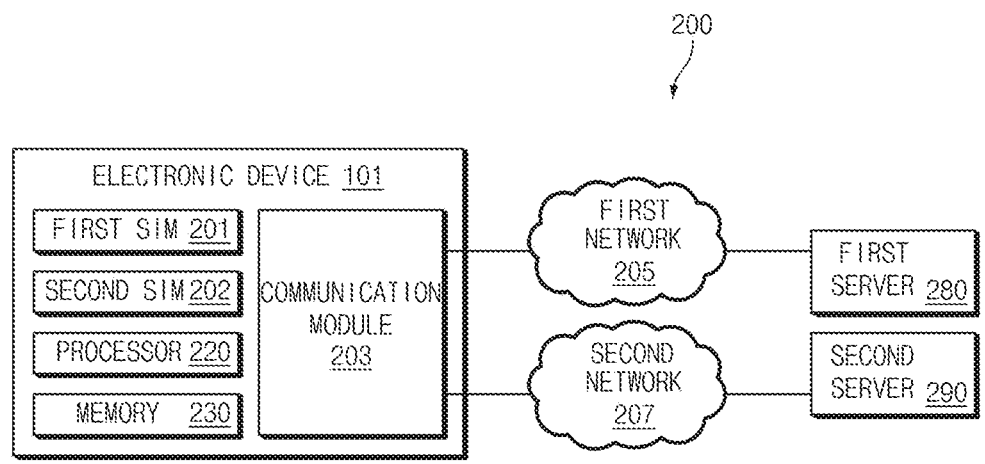
FIG. 2 illustrates a network environment supporting a dual SIM according to various embodiments.

FIG. 2 illustrates a network environment 200 supporting a dual subscriber identification module (SIM) according to various embodiments.

Referring to FIG. 2, in a network environment 200 (e.g., a network environment 100 of FIG. 1) an electronic device 101 (e.g., an electronic device 101 of FIG. 1) may receive an internet protocol multimedia subsystem (IMS) service from a first server 280 or a second server 290 over a first network 205 or a second network 207 (e.g., a network 199 of FIG. 1). The IMS service may include a voice call service based on internet protocol (IP), for example, voice over internet protocol (VoIP). The electronic device 101 may perform a voice call based on a packet using the VoIP. When supporting the long term evolution (LTE) specification defined by the $3^{rd}$ generation partnership project (3GPP), the electronic device 101 may perform a voice call through a voice over LTE (VoLTE) service using a radio frequency (RF) resource of the LTE specification.

According to an embodiment, the electronic device 101 may include a communication module 203 (e.g., a communication module 190 of FIG. 1). The communication module 203 may include an RF module (not shown) for processing a signal of an RF band. The electronic device 101 may transmit the signal processed by the communication module 203 to the first network 205 or the second network 207 and may process a signal, received from the first network 205 or the second network 207, using the communication module 203.

According to an embodiment, the electronic device 101 (e.g., the electronic device 101 of FIG. 1) may support a dual SIM. For example, the electronic device 101 may include a first SIM 201 and a second SIM 202. The SIM 201 and the second SIM 202 may correspond to a subscriber identification module 196 of FIG. 1. The first SIM 201 and the second SIM 202 may provide information associated with user authentication or a security function. According to an embodiment, the first SIM 201 and the second SIM 202 may correspond to different IMS servers or may correspond to phone numbers of different electronic devices 101. For example, when network operators of the first SIM 201 and the second SIM 202 differ from each other, the electronic device 101 may receive an IMS service from the first server 280 over the first network 205 when using the first SIM 201 and may receive an IMS service from the second server 290 over the second network 207 when using the second SIM 202. For another example, a phone number of the electronic device 101 corresponding to the first SIM 201 may be 010-1234-xxxx, and a phone number of the electronic device 101 corresponding to the second SIM 202 may be 010-4321-xxxx.

According to an embodiment, the electronic device 101 may receive a packet-based VoIP service such as VoLTE using the first SIM 201 or the second SIM 202. For example, when network operators of the first SIM 201 and the second SIM 202 differ from each other, the electronic device 101 may perform a voice call through the first network 205 and the first server 280 when using the first SIM 201 and may perform a voice call through the second network 207 and the second server 290 when using the second SIM 202.

According to an embodiment, the electronic device 101 may include a processor 220 (e.g., a processor 120 of FIG. 1). The processor 220 may be operatively connected with the first SIM 201, the second SIM 202, and the communication module 203. According to an embodiment, the processor 220 may perform overall operations of the electronic device 101 by executing instructions stored in a memory 230.

According to an embodiment, the electronic device 101 may include the memory 230 (e.g., a memory 130 of FIG. 1). The memory 230 may store instructions causing the processor 220 to perform the overall operations of the electronic device 101.

According to an embodiment, the first server 280 or the second server 290 may provide the electronic device 101 with an IMS service (e.g., VoIP). In the disclosure, the first server 280 and the second server 290 may be referred to as IMS servers. The first server 280 or the second server 290 may be a single entity and may be a set of a plurality of entities. The first server 280 or the second server 290 and the electronic device 101 may transmit and receive a session initiation protocol (SIP) message for a voice call.

According to an embodiment, a network (e.g., the first network 205 or the second network 207) may refer to an architecture which transmits data between the electronic device 101 and the first server 280 or the second server 290. For example, the network may include a base station (e.g., an evolved node b (eNB)) and an evolved packet core (EPC), which are defined by the LTE specification. The EPC may include, for example, a mobility management entity (MME), a serving-gateway (S-GW), a packet data network (PDN)-gateway (P-GW), a policy charging and rules function (PCRF), and a home subscriber service (HSS). The base station 210 may be connected with the electronic device 101 over a radio channel and may play a similar role to an existing radio network controller/base station controller (RNC/BSC). The MME may be a node for controlling a control plane of the EPC and may perform various functions such as the connection and release of the radio bearer. The S-GW may be a node for controlling a user plane for an LTE radio access network (RAN) in the EPC, which may operate as a mobility anchor for the electronic device 101 or may generate or remove a data bearer under control of the MME. The P-GW may be a node for connecting an external network (e.g., the Internet, the first server 280, or the second server 290) with the EPC, which may allocate an IP address to the electronic device 101 and may apply a quality of service (QoS) according to the PCRF. The PCRF may be a device for controlling a policy associated with a quality of service (QoS) of a user, which may deliver a policy and charging control (PCC) rule corresponding to the policy to the P-GW. The HSS may be a node having subscriber information.

According to an embodiment, in the network, the QoS may be applied for each evolved packet system (EPS) bearer. One EPS bearer may be used to transmit IP flows having the same QoS requirements. According to an embodiment, the electronic device 101 may transmit voice data to the first serve 280 or the second server 290 over the S-GW and the P-GW using a dedicated EPS bearer. Similarly, the electronic device 101 may receive voice data from the first server 280 or the second server 290 using the dedicated EPS bearer.

According to an embodiment, the electronic device 101 may be registered with the first server 280 or the second server 290 over the network (e.g., the first network 205 or the second network 207). The registration may mean that, for example, a packet data network (PDN) between the electronic device 101 and the first server 280 or the second server 290 is established by the P-GW. The electronic device 101 may initiate the procedure of registration with the first server 280 or the second server 290 in booting instance or may initiate the procedure of registration when a network environment of the electronic device 101 is changed. The first server 280 or the second server 290 may identify whether it is possible for the electronic device 101 to perform VoIP, based on whether the electronic device 101 is registered.

In embodiments described below, it may be assumed that the electronic device 101 performs a packet-based voice call (e.g., VoLTE) in the above-mentioned LTE communication system. However, embodiments below are not limited to the LTE communication system and are applicable to a 3GPP 5$^{th}$ generation (5G) communication system or another packet-based wireless communication network.

Figure 3:
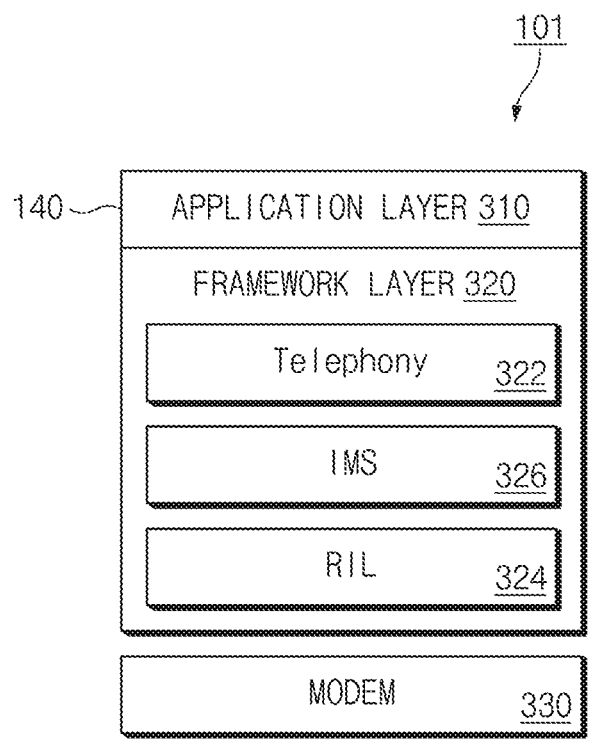
FIG. 3 illustrates a structure of layers for processing a VoIP technology according to various embodiments.

FIG. 3 illustrates a structure of layers of an electronic device 101 for processing the VoIP technology according to various embodiments.

When instructions (or commands) stored in a memory 130 (e.g., a memory 130 of FIG. 1 or a memory 230 of FIG. 2) are executed by a processor 220 (e.g., a processor 220 of FIG. 2), data for a voice call may be processed by a program 140 (e.g., a program 140 of FIG. 1) including the instructions. The data processed by the program 140 may be transmitted through a modem 330, and data received through the modem 330 may be processed by the program 140. According to an embodiment, the modem 330 may be included in an auxiliary processor 123 of FIG. 1 or a communication module 203 of FIG. 2.

According to an embodiment, the program 140 may be referred to as software or a module. The program 140 may include an application layer 310 and a framework layer 320. Although not illustrated in FIG. 3, the program 140 may further include a kernel layer below the framework layer 320.

According to an embodiment, the application layer 310 may include the application 146 of FIG. 1. For example, the application layer 310 may include a contact application or a call application. The application layer 310 may perform a function of providing a user with various services (e.g., an IMS service, an internet service, and the like) provided from an external network (e.g., a first server 280 or a second server 290 of FIG. 2). According to an embodiment, the application layer 310 may store information associated with a contact of another electronic device or information associated with a SIM. The information associated with the contact may include, for example, at least one of a phone number, a user name, an address, or an e-mail address of the other electronic device. The information associated with the SIM may include, for example, a type (e.g., the first SIM 201 or the second SIM 202) of a SIM used in the other electronic device, a phone number corresponding to the SIM, and information about whether to release the information associated with the SIM. The information about whether to release the information may be stored in, for example, a flag data format.

According to an embodiment, the framework layer 320 may perform data processing for delivering data for the IMS service or the internet service to the modem 330. The framework layer 320 may include a telephony 322, a radio interface layer (RIL) 324, and an IMS 326.

According to an embodiment, the telephony 322 may provide an application programming interface (API) for accessing (e.g., transmitting and receiving data) the modem 330 via the RIL 324 at the application layer 310. The telephony 322 may include, for example, a call origination/termination service, a data service, a SIM recognition service, an SMS, a network search and connection service, or the like. The API provided by the telephony 322 may vary with a type (e.g., GSM, CDMA, or IMS) of network to which data is transmitted via the modem 330.

According to an embodiment, the RIL 324 may provide an interface associated with wireless communication between the program 140 and the modem 330. For example, applications included in the application layer 310 may control the modem 330 through the RIL 324 using the API provided from the telephony 322 and may transmit and receive a message with the modem 330.

According to an embodiment, the IMS 326 may process data associated with an IMS service. For example, when a call application is executed in the electronic device 101 and when the electronic device 101 receives a user input requesting a voice call from another electronic device from the user, the IMS 326 may generate a message (e.g., an SIP INVITE message) requesting the voice call and may deliver the generated message to the model 330 via the RIL 324. For another example, when a message requesting the voice call from the electronic device 101 is received via the modem 330 from the other electronic device, the IMS 326 may deliver the received message to the application layer 310 to notify the user of the electronic device 101 that the call request is received.

According to an embodiment, the IMS 326 may store the information associated with the contact of the other electronic device or the information associated with the SIM. The information stored by the IMS 326 may be the same as the information stored by the application layer 310, or at least a portion of the information may be stored in another format. According to an embodiment, the information associated with the SIM may be stored in a mapping table format.

According to an embodiment, the modem 330 may process a transmitted and received message in a baseband. The modem 330 may transmit the data processed in the baseband to the first server 280 or the second server 290 via a communication module 203 of FIG. 2. According to an embodiment, when a voice call is established between the electronic device 101 and anther electronic device, the electronic device 101 may transmit and receive voice data via the modem 330 without intervention of the IMS 326. For example, the modem 330 may establish a user datagram protocol (UDP) layer or a transmission control protocol (TCP) layer with another electronic device and may transmit and receive a real-time transport protocol (RTP) packet, thus providing a user with a call function.

Figure 4:
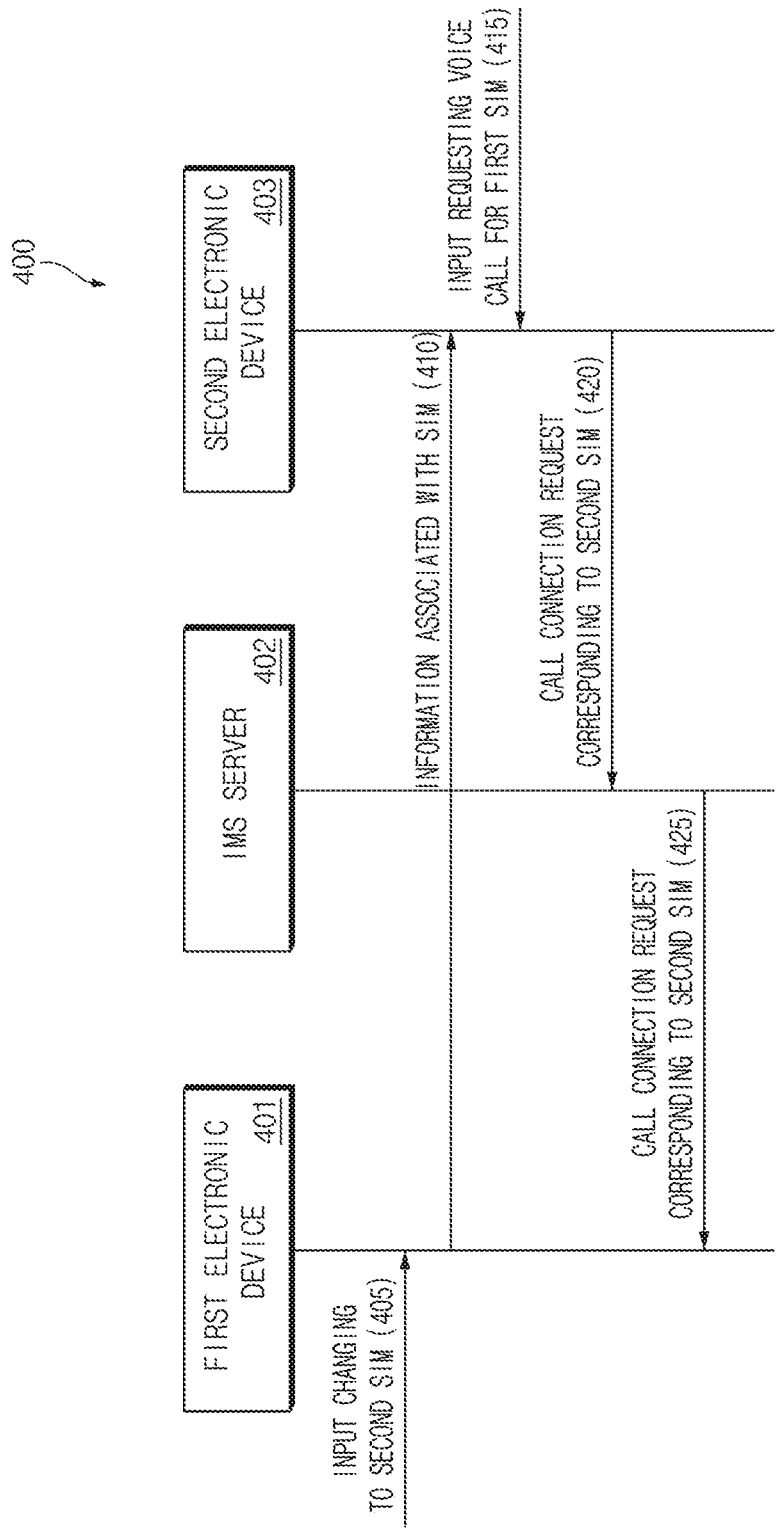
FIG. 4 illustrates a signal sequence diagram of an electronic device, which transmits information associated with a SIM, and another electronic device according to various embodiments.

FIG. 4 illustrates a signal sequence diagram of an electronic device, which transmits information associated with a SIM, and another electronic device according to various embodiments.

Referring to FIG. 4, in a network environment 400 (e.g., a network environment 100 of FIG. 1 or a network environment 200 of FIG. 2), a first electronic device 401 and a second electronic device 403 may refer to entities for performing a voice call based on VoIP. The electronic device 401 and the second electronic device 403 may be the same as an electronic device 101 shown in FIG. 1, FIG. 2, and FIG. 3, or at least a portion thereof may include another component. The electronic device 401 and the second electronic device 403 may be implemented in a similar principle to an operation principle of the electronic device 101 shown in FIG. 1, FIG. 2, and FIG. 3.

According to an embodiment, an IMS server 402 may include a first server 280 or a second server 290 of FIG. 2. For example, when the first electronic device 201 uses a second SIM 202, the IMS server 402 may refer to the second server 290.

According to an embodiment, in operation 405, the first electronic device 401 may receive a user input changing from a first SIM 201 to the second SIM 202. In response to the user input, the first electronic device 401 may change a SIM used in the first electronic device 401 from the first SIM 201 to the second SIM 202.

According to an embodiment, in operation 410, the first electronic device 401 may transmit information associated with the SIM to the second electronic device 403. The information associated with the SIM may include, for example, information associated with the first SIM 201 or information associated with the second SIM 202. According to an embodiment, the first electronic device 401 may adaptively transmit the information associated with the second SIM 202 based on whether the second electronic device 403 is IMS registered. For example, when the second electronic device 403 is IMS registered, the first electronic device 401 may transmit the information associated with the second SIM 202 to the second electronic device 403 using an SIP message. For another example, when the second electronic device 404 is not IMS registered, the first electronic device 401 may transmit the information associated with the second SIM 202 using a hypertext transfer protocol (HTTP) or a short message service (SMS).

According to an embodiment, the first electronic device 401 may identify whether the second electronic device 403 is IMS registered, via the IMS server 402. For example, the first electronic device 401 may receive a message, indicating whether other electronic devices registered with a contact of the first electronic device 401 are IMS registered, periodically per specified time from the IMS server 402. For another example, when an IMS registration state of the second electronic device 403 is changed, the first electronic device 401 may receive a message indicating whether the second electronic device 403 is IMS registered from the IMS server 402.

According to an embodiment, in operation 415, the second electronic device 403 may receive a user input requesting a voice call for the first SIM 201. For example, the second electronic device 403 may receive a user input selecting a contact of the first electronic device 401 (e.g., a user name of the first electronic device 401) in a contact list stored in the second electronic device 403. For another example, the second electronic device 403 may receive a user input inputting a phone number (e.g., 010-1234-xxxx) corresponding to the first SIM 201 of the first electronic device 401.

According to an embodiment, in operation 420, the second electronic device 403 may transmit a message requesting a voice call for the second SIM 202 to the IMS server 402. The request message may include, for example, an SIP INVITE message.

According to an embodiment, in operation 425, the IMS server 402 may transmit a message (e.g., an SIP INVITE message) requesting a voice call to the first electronic device 401. According to an embodiment, while the first electronic device 401 performs a voice call with another electronic device rather than the second electronic device 403 using the second SIM 405, the IMS server 402 may notify the first electronic device 401 that the second electronic device 403 requests the voice call by transmitting a paging signal.

According to various embodiments, although the first electronic device 401 changes the SIM, when the second electronic device 403 knows information associated with the changed SIM (e.g., the second SIM 202) in advance, it may request a voice call through the changed SIM. Thus, although the first electronic device 401 is performing a voice call according to VoIP through the changed SIM, the first electronic device 401 may notify a user that the second electronic device 403 requests the voice call by receiving a message requesting the voice call from the IMS server 402.

Figure 5:
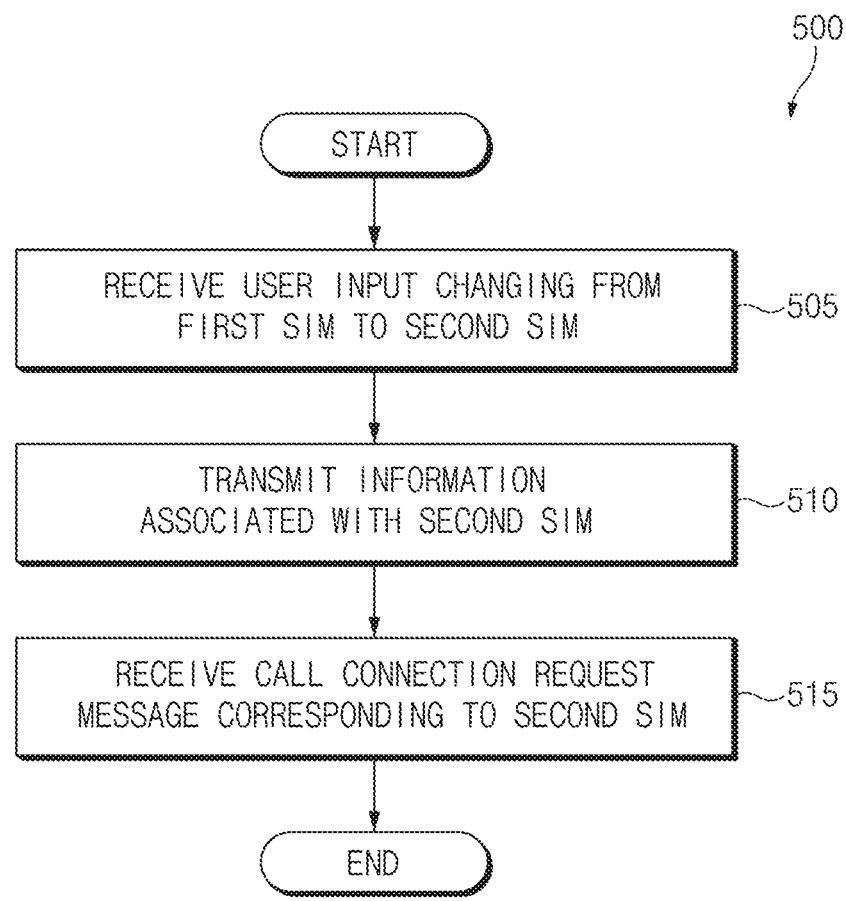
FIG. 5 illustrates an operational flowchart of an electronic device for transmitting information associated with a SIM according to various embodiments.

FIG. 5 illustrates an operational flowchart of an electronic device 101 for transmitting information associated with a SIM according to various embodiments. Operations shown in FIG. 5 may be performed by a first electronic device 401 or a component (e.g., a processor 120 of FIG. 1) included in the first electronic device 401.

Referring to FIG. 5, in operation 505 of method 500, the first electronic device 401 (e.g., the processor 120) according to an embodiment may receive a user input changing from a first SIM 201 to a second SIM 202. According to an embodiment, the first SIM 201 and the second SIM 202 may differ from each other in a phone number and a network operator of the electronic device 101. According to an embodiment, the first electronic device 401 (e.g., at least one of a call application, a contact application, or a setting application) may display a user interface (UI) associated with a SIM change.

According to an embodiment, in operation 510, the first electronic device 401 may transmit information associated with the second SIM 202 to the second electronic device 403. For example, when the second electronic device 403 is IMS registered, the first electronic device 401 may transmit the information associated with the second SIM 202 using an SIP message. For another example, when the second electronic device 403 is not IMS registered, the first electronic device 401 may transmit the information associated with the second SIM 202 using an HTTP or an SMS. According to an embodiment, the information associated with the second SIM 202 may include data indicating whether to release the information associated with the second SIM 202. For example, when receiving a user input making the information associated with the second SIM 202 private, the first electronic device 401 may generate data to indicate that the information associated with the second SIM 202 is private. According to an embodiment, the first electronic device 401 (e.g., the call application, the contact application, or the setting application) may display a UI, setting whether to release the information associated with the first SIM 201 or the second SIM 202 to a counterpart, on its screen.

In operation 515, the first electronic device 401 may receive a message requesting a voice call for the second SIM 202. The message requesting the voice call may include, for example, an SIP INVITE message. According to an embodiment, the first electronic device 401 may receive a message requesting a voice call during the voice call with a third electronic device different from the second electronic device 403.

Figure 6:
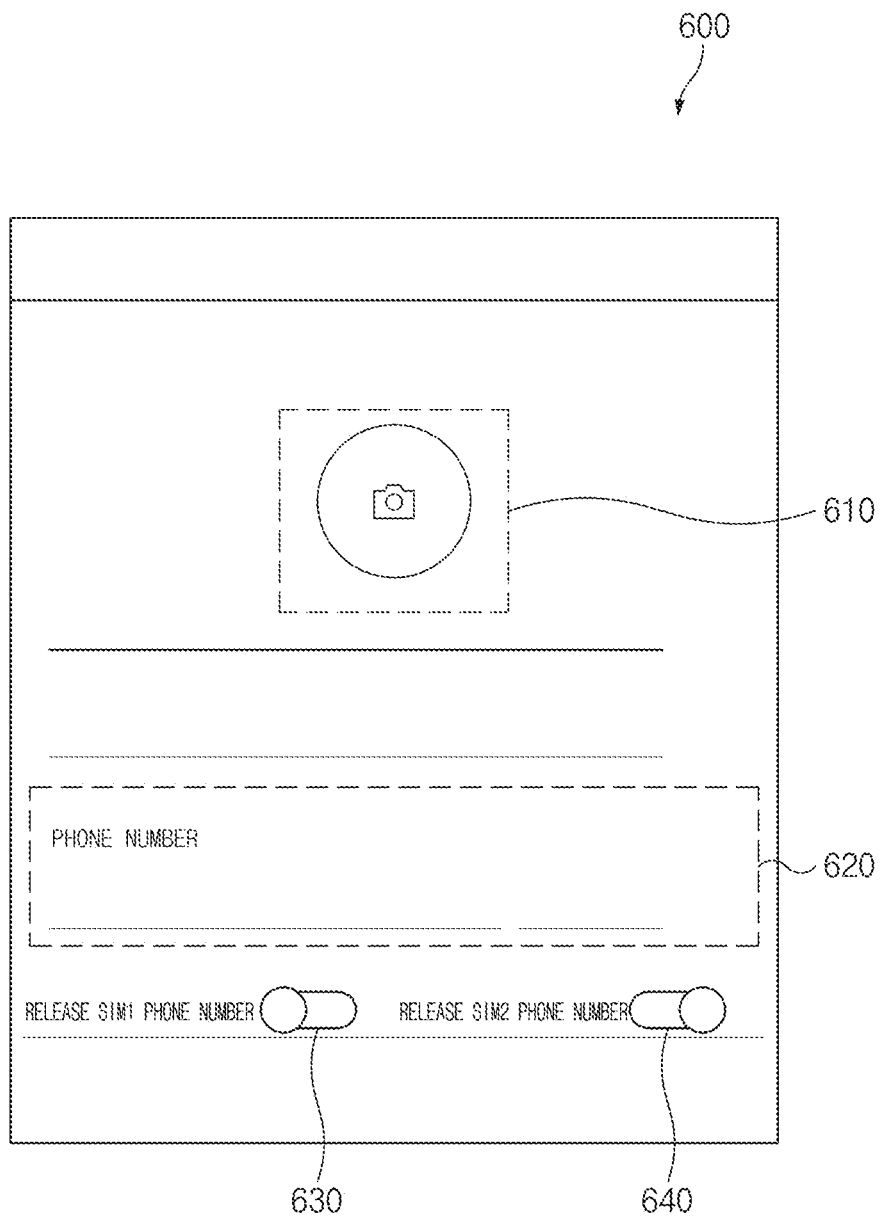
FIG. 6 illustrates a user interface (UI) for setting whether to release information associated with a SIM according to various embodiments.

FIG. 6 illustrates a user interface (UI) for setting whether to release information associated with a SIM according to various embodiments.

Referring to FIG. 6, a first electronic device (e.g., an electronic device 101 of FIG. 1 or a first electronic device 401 of FIG. 4) may display a screen 600 indicating a contact of another electronic device on a display (e.g., a display device 160 of FIG. 1). The other electronic device may include, for example, a second electronic device 403 of FIG. 4. In a screen 600, the first electronic device 401 may display a first UI 630 for setting whether to release information associated with a first SIM 201 and a second UI 640 for setting whether to release information associated with a second SIM 202.

According to an embodiment, the first electronic device 401 may display the first UI 630 and the second UI 640 below a first region 620 displaying a phone number of another electronic device. Locations of the first UI 630 and the second UI 640 shown in FIG. 6 are merely illustrative, and the locations of the first UI 630 and the second UI 640 may be changed. For example, the first electronic device 401 may display the first UI 630 and the second UI 640 between a second region 610 indicating an image or an emoticon of the other electronic device and the first region 620. For another example, the first electronic device 401 may arrange the first UI 630 and the second UI 640 above the second region 610.

According to an embodiment, the first electronic device 401 may receive a user input changing at least one of information associated with the first SIM 201 and information associated with the second SIM 202 via the first UI 630 and the second UI 640. For example, the first electronic device 401 may receive a user input making the information associated with the second SIM 202 private, while a screen (e.g., the screen 600) indicating a contact of the second electronic device 403 is displayed. In this case, information transmitted to the second electronic device 403 may include data indicating that the information associated with the second SIM 202 is private.

Figure 7:
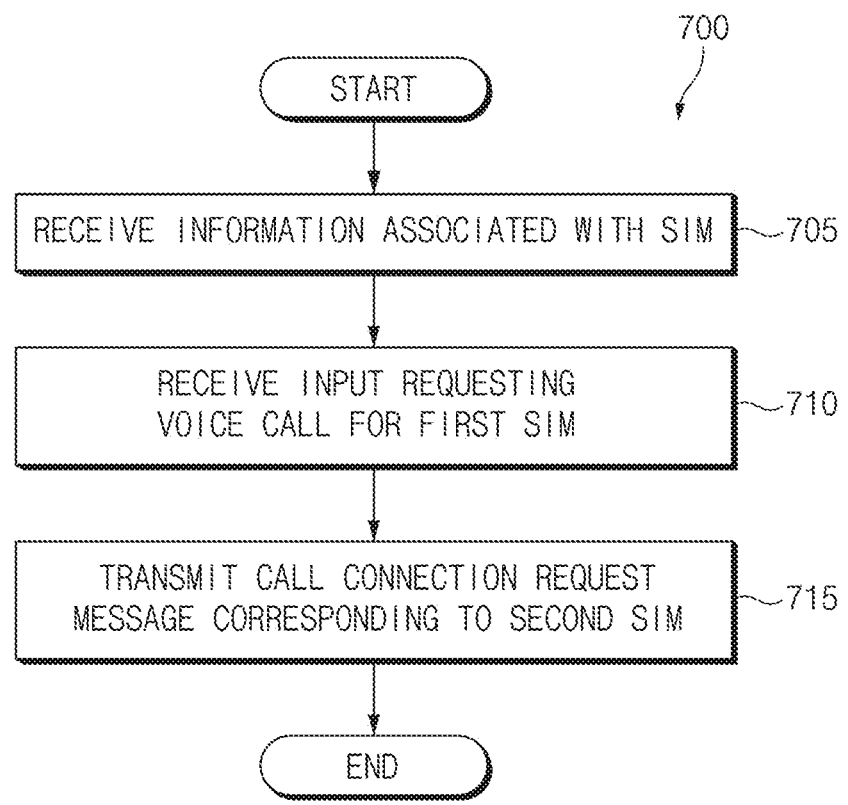
FIG. 7 illustrates an operational flowchart of an electronic device for transmitting a voice call request message based on information associated with a SIM according to various embodiments.

FIG. 7 illustrates an operational flowchart of an electronic device for transmitting a voice call request message based on information associated with a SIM according to various embodiments. Operations shown in FIG. 7 may be performed by an electronic device 403 or a component (e.g., a processor 120 of FIG. 1) included in the second electronic device 403.

Referring to FIG. 7, in operation 705 of method 700, a second electronic device 403 (e.g., a processor 120 of FIG. 1) according to an embodiment may receive information associated with a second SIM 202 of a first electronic device 401 from the first electronic device 401. According to an embodiment, when the second electronic device 403 is IMS registered, it may receive the information associated with the second SIM 202 using an SIP message. For another example, when the second electronic device 403 is not IMS registered, it may receive the information associated with the second SIM 202 using an HTTP or an SMS.

According to an embodiment, in operation 710, the second electronic device 403 may receive a user input requesting a voice call for the first SIM 401 of the first electronic device 401. For example, the second electronic device 403 may receive a user input selecting a contact of the first electronic device 401 (e.g., a user name of the first electronic device 401) in a contact list stored in the second electronic device 403. For another example, the second electronic device 403 may receive a user input inputting a phone number (e.g., 010-1234-xxxx) corresponding to the first SIM 201 of the first electronic device 401.

According to an embodiment, in operation 715, the second electronic device 403 may transmit a message requesting a voice call for the second SIM 202 to the IMS server 402. The message requesting the voice call may include, for example, an SIP INVITE message.

Figure 8:
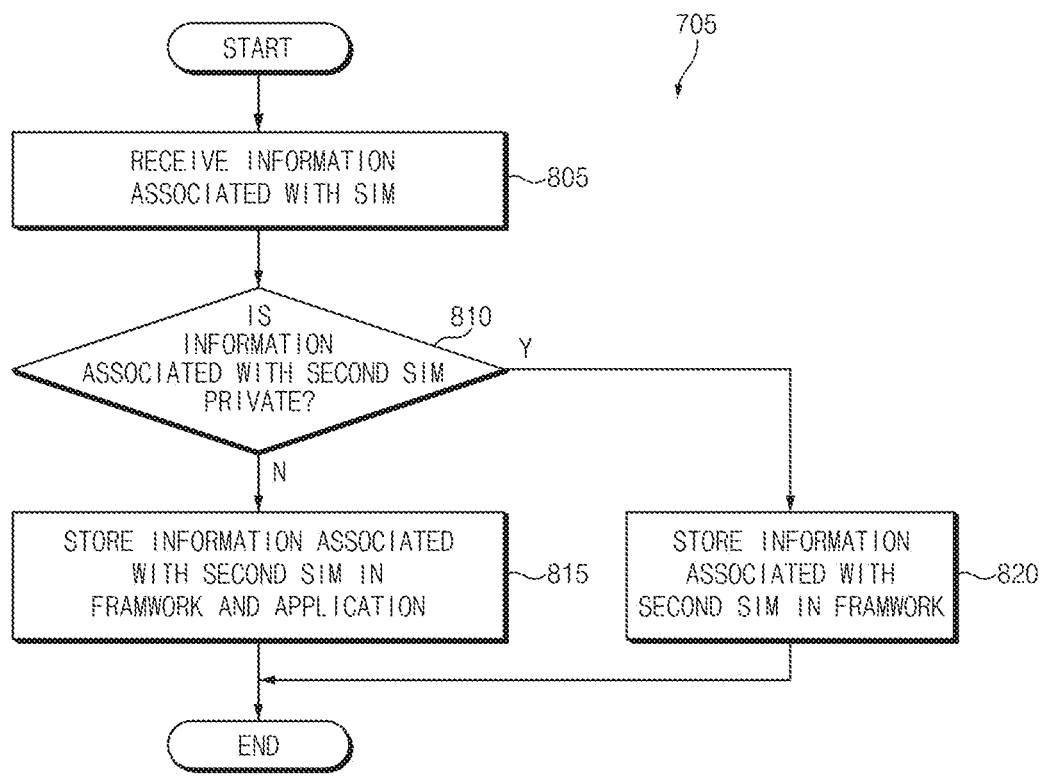
FIG. 8 illustrates an operational flowchart of an electronic device for storing information associated with a second SIM according to various embodiments.

FIG. 8 illustrates an operational flowchart of an electronic device for storing information associated with a second SIM according to various embodiments. Operations shown in FIG. 8 may refer to operations performed by operation 705 of FIG. 7 according to an embodiment.

Referring to FIG. 8, in operation 805, a second electronic device 403 according to an embodiment may receive information associated with a second SIM 202. According to an embodiment, the information associated with the second SIM 202 may include data indicating whether to release the information associated with the second SIM 202.

According to an embodiment, in operation 810, the second electronic device 403 may identify whether the information associated with the second SIM 202 is private. When the information associated with the second SIM 202 is not private (N), the second electronic device 403 may perform operation 815. When the information associated with the second SIM 202 is private (Y), the second electronic device 403 may perform operation 820.

According to an embodiment, in operation 815, the second electronic device 403 may store the information associated with the second SIM 202 through a framework layer 320 or an application layer 310. For example, the second electronic device 403 may store the information associated with the second SIM 202 through an IMS 326 of the framework layer 320 and a call application of the second electronic device 403. Information stored by the IMS 326 may fail to be displayed to a user of the second electronic device 403, whereas information stored by the call application may be displayed to the user of the second electronic device 403. According to an embodiment, a file format of the information stored by the IMS 326 and a file format of the information stored by the call application may differ from each other.

According to an embodiment, in operation 820, the second electronic device 403 may store the information associated with the second SIM 202 through the framework 320. The information stored by the framework 320, that is, the IMS 326 may fail to be displayed to the user of the second electronic device 403. According to an embodiment, information associated with the SIM, which is stored by the framework 320 (or the call application), (e.g., the information associated with the second SIM 202) may be represented in a mapping table format as shown in Table 1 below.

TABLE 1

| SIM Type | Phone Number | Release |
| --- | --- | --- |
| Main SIM | 010-4321-xxxx | Private |
| Secondary SIM | 010-1234-xxxx | Public |

Because the second electronic device 403 identifies that the SIM of the first electronic device 401 is changed, a main SIM in Table 1 may include phone number (010-4321-xxxx) information corresponding to the second SIM 202. According to an embodiment, information indicating whether to release a phone number corresponding to the first SIM 201 or the second SIM 202 may be represented in a flag data format of 1 bit.

According to various embodiments, according to a request of the user of the first electronic device 401, the information associated with the second SIM 202 may fail to be released to the user of the second electronic device 403. As information about a specified SIM is not exposed, private information of the user of the first electronic device 401 using a dual SIM may be protected.

Figure 9:
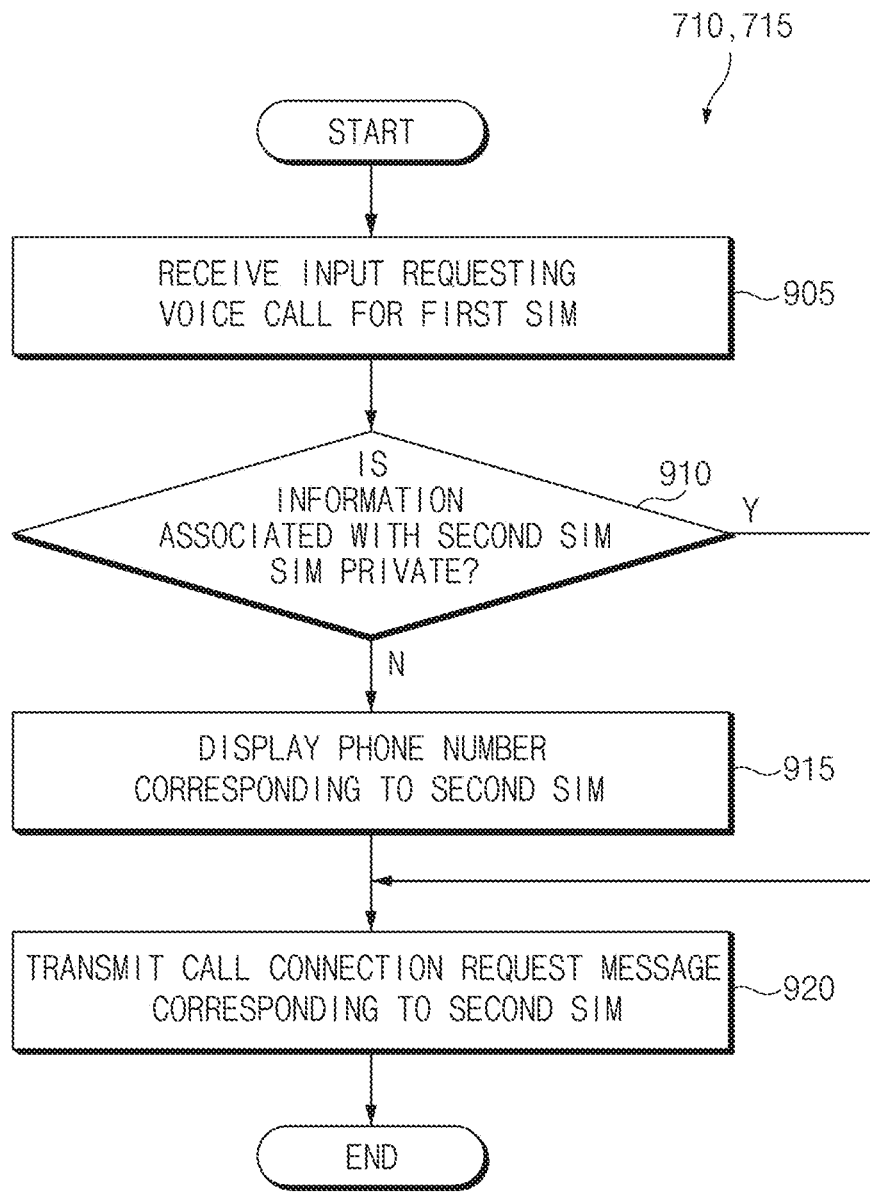
FIG. 9 illustrates an operational flowchart of an electronic device for selectively displaying information associated with a second SIM according to various embodiments.

FIG. 9 illustrates an operational flowchart of an electronic device for selectively displaying information associated with a second SIM according to various embodiments. Operations shown in FIG. 9 may refer to operations performed by operations 710 and 715 of FIG. 7 according to an embodiment.

Referring to FIG. 9, the second electronic device 403 (e.g., a processor 120 of FIG. 1) according to an embodiment may receive a user input requesting a voice call for a first SIM 201 of a first electronic device 401. Because the second electronic device 403 receives information associated with a second SIM 202 in operation 705 of FIG. 7, it may determine to transmit a message requesting a voice call for the second SIM 202 rather than the first SIM 201.

In operation 910, the second electronic device 403 may identify whether the information associated with the second SIM 202 is private. When the information associated with the second SIM 202 is not private (N), in operation 915, the second electronic device 403 may display a phone number (e.g., 010-4321-xxxx) corresponding to the second SIM 202 on its display and may perform operation 920. When the information associated with the second SIM 202 is private (Y), the second electronic device 403 may perform operation 920 without performing operation 915. FIG. 9 illustrates an embodiment where operation 915 and operation 920 are sequentially performed, but an order where operation 915 and operation 920 are performed is not limited to the example shown in FIG. 9. For example, the second electronic device 403 may perform operation 915 and operation 920 at the same time or may perform operation 915 after performing operation 920.

Figure 10:
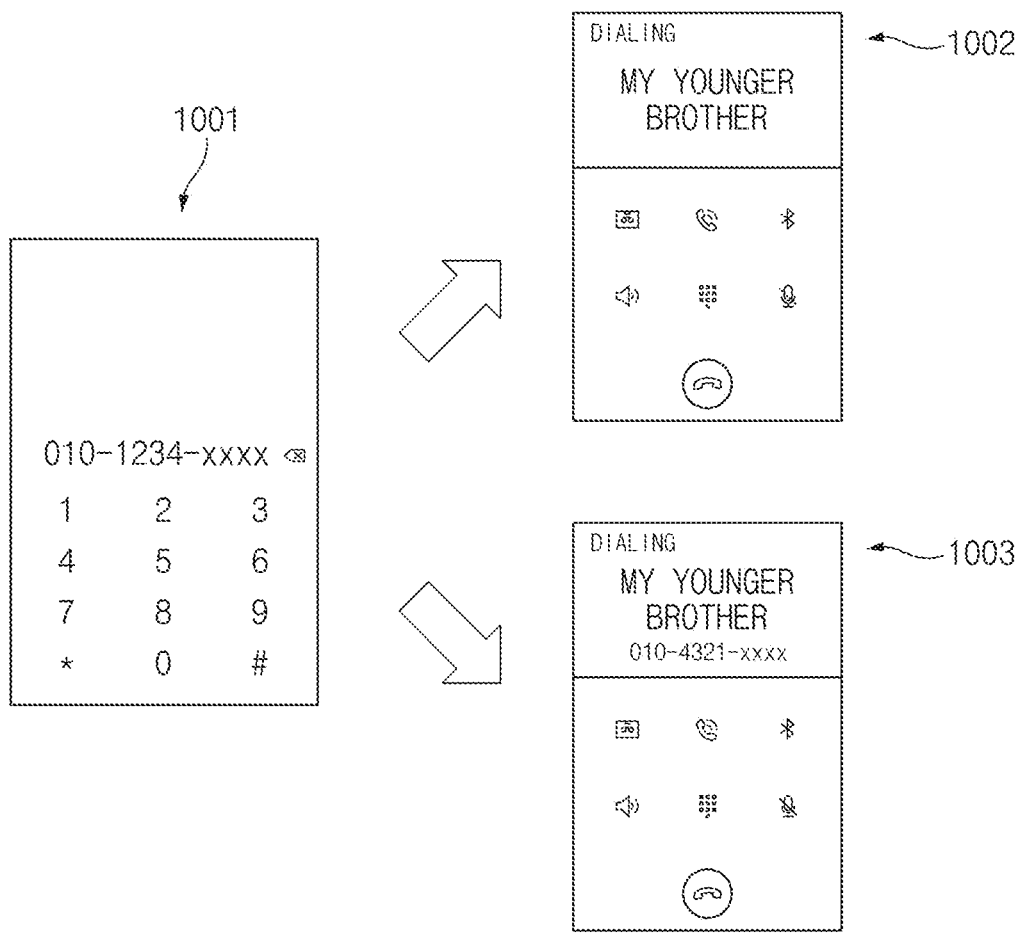
FIG. 10 illustrates an operation of displaying a phone number for a second SIM according to various embodiments.

FIG. 10 illustrates an operation of displaying a phone number for a second SIM according to various embodiments. FIG. 10 may refer to a drawing illustrating the embodiment shown in FIG. 9.

As shown in reference numeral 1001 of FIG. 10, a second electronic device 403 may receive a user input requesting a voice call for a first SIM 201. For example, the second electronic device 403 may receive a user input inputting a phone number (e.g., 010-1234-xxxx) corresponding to the first SIM 201 of a first electronic device 401 through a keypad of a call application. For another example, although not illustrated in FIG. 10, the second electronic device 403 may receive a user input selecting a contact of the first electronic device 401 in a contact list of the second electronic device 403.

According to an embodiment, when information associated with a second SIM 202 is private, as shown in reference numeral 1002, the second electronic device 403 may fail to display a phone number (e.g., 010-4321-xxxx) corresponding to the second SIM 202 and may display a user name (e.g., "my younger brother") of the first electronic device 401.

According to an embodiment, when the information associated with the second SIM 202 is public, as shown in reference numeral 1003, the second electronic device 403 may display the phone number corresponding to the second SIM 202 together with the user name of the first electronic device 401. Although not illustrated in FIG. 10, the second electronic device 403 may separately display a UI indicating that the SIM used by the first electronic device 401 changes from the first SIM 401 to the second SIM 403 on its display.

As described above, an electronic device (e.g., an electronic device 101 of FIG. 1 or a second electronic device 403 of FIG. 4) may include a communication module (e.g., a communication module 203), a processor (e.g., a processor 220 of FIG. 2) operatively connected with the communication module, and a memory (e.g., a memory 220 of FIG. 2) operatively connected with the processor. The memory may include instructions, when executed by the processor, causing the processor to receive information associated with another electronic device from the other electronic device (e.g., a first electronic device 401 of FIG. 4) via the communication module, receive a user input requesting a voice call for a first SIM of the other electronic device, and transmit a message requesting a voice call to a second SIM of the other electronic device to an IMS server (e.g., an IMS server 402 of FIG. 4) via the communication module based on the information associated with the SIM.

According to an embodiment, the processor is configured to receive the information associated with the SIM using an SIP message.

According to an embodiment, the processor is configured to receive the information associated with the SIM using an HTTP or an SMS.

According to an embodiment, the processor is configured to identify whether information associated with the second SIM is private, based on the information associated with the SIM, and store the information associated with the second SIM through a framework layer of the electronic device, when the information associated with the second SIM is private.

According to an embodiment, the processor is configured to identify whether information associated with the second SIM is private, based on the information associated with the SIM, and store the information associated with the second SIM through a framework layer and an application layer of the electronic device, when the information associated with the second SIM is public.

According to an embodiment, the processor is configured to identify whether information associated with the second SIM is private, based on the information associated with the SIM, and display a phone number corresponding to the second SIM on a display of the electronic device, when the information associated with the second SIM is public.

According to an embodiment, the processor is configured to identify whether information associated with the second SIM is private, based on the information associated with the SIM, and display a phone number corresponding to the first SIM on a display of the electronic device, when the information associated with the second SIM is private.

According to an embodiment, the processor is configured to, when a voice call is established with the other electronic device, perform the voice call with the other electronic device using VoIP.

As described above, an electronic device (e.g., an electronic device of FIG. 1 or a first electronic device 401 of FIG. 4) may include a first SIM (e.g., a first SIM 201 of FIG. 2), a second SIM (e.g., a second SIM 202 of FIG. 2), a communication module (e.g., a communication module 203 of FIG. 2), a processor (e.g., a processor 220 of FIG. 2) operatively connected with the first SIM, the second SIM, and the communication module, and a memory (e.g., a memory 230 of FIG. 2) operatively connected with the processor. The memory may include instructions, when executed by the processor, causing the processor to receive a user input changing from the first SIM to the second SIM, transmit information associated with the second SIM to another electronic device (e.g., a second device 403 of FIG. 4) via the communication module, and receive a message requesting a voice call for the second SIM from an IMS server (e.g., an IMS server 402 of FIG. 2) via the communication module.

According to an embodiment, the processor is configured to receive a user input making the information associated with the second SIM private and generate the information associated with the second SIM, the information including data indicating that the information associated with the second SIM is private.

According to an embodiment, the processor is configured to display a screen indicating a contact of the other electronic device on a display of the electronic device and display a UI for making the information associated with the second SIM private, in the screen.

According to an embodiment, the processor is configured to display the UI below a region displaying a phone number of the other electronic device in the screen.

According to an embodiment, the processor is configured to identify whether the other electronic device is IMS registered and transmit information associated with the second SIM using an SIP message, when the other electronic device is IMS registered.

According to an embodiment, the processor is configured to transmit information associated with the second SIM using an HTTP or an SMS, when the other electronic device is not IMS registered.

According to an embodiment, the processor is configured to perform a voice call with the other electronic device using VoIP.

As described above, a method of an electronic device (e.g., a second electronic device 403 of FIG. 4) may include receiving information associated with a SIM of another electronic device from the other electronic device (e.g., a first electronic device 401 of FIG. 4), receiving a user input requesting a voice call for a first SIM of the other electronic device, and transmitting a message requesting a voice call for a second SIM of the other electronic device to an IMS server based on the information associated with the SIM.

According to an embodiment, the receiving of the information associated with the SIM may include receiving the information associated with the SIM using at least one of an SIP message, an HTTP, or an SMS.

According to an embodiment, the method may further include identifying when the information associated with the second SIM is private, based on the information associated with the SIM, and storing the information associated with the second SIM through a framework layer of the electronic device, when the information associated with the second SIM is private.

According to an embodiment, the method may further include storing the information associated with the second SIM through the framework layer and an application layer of the electronic device, when the information associated with the second SIM is public.

According to an embodiment, the method may further include displaying a phone number for the second SIM on a display of the electronic device, when the information associated with the second SIM is public.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a communication module;
    a processor operatively connected with the communication module; and
    a memory operatively connected with the processor,
    wherein the memory includes instructions, when executed by the processor, causing the processor to:
        receive information associated with a subscriber identification module (SIM) of another electronic device from the other electronic device via the communication module;
        receive a user input requesting a voice call for a first SIM of the other electronic device; and
        transmit a message requesting a voice call for a second SIM of the other electronic device to an internet protocol multimedia subsystem (IMS) server via the communication module based on the information associated with the SIM.

2. The electronic device of claim 1, wherein the processor is configured to:
    receive the information associated with the SIM using a session initiation protocol (SIP) message.

3. The electronic device of claim 1, wherein the processor is configured to:
    receive the information associated with the SIM using a hypertext transfer protocol (HTTP) or a short message service (SMS).

4. The electronic device of claim 1, wherein the processor is configured to:
    identify whether information associated with the second SIM is private, based on the information associated with the SIM; and
    store the information associated with the second SIM through a framework layer of the electronic device, when the information associated with the second SIM is private.

5. The electronic device of claim 1, wherein the processor is configured to:
    identify whether information associated with the second SIM is private, based on the information associated with the SIM; and
    store the information associated with the second SIM through a framework layer and an application layer of the electronic device, when the information associated with the second SIM is public.

6. The electronic device of claim 1, wherein the processor is configured to:
    identify whether information associated with the second SIM is private, based on the information associated with the SIM; and
    display a phone number corresponding to the second SIM on a display of the electronic device, when the information associated with the second SIM is public.

7. The electronic device of claim 1, wherein the processor is configured to:
    identify whether information associated with the second SIM is private, based on the information associated with the SIM; and
    display a phone number corresponding to the first SIM on a display of the electronic device, when the information associated with the second SIM is private.

8. The electronic device of claim 1, wherein the processor is configured to:
    when a voice call is established with the other electronic device, perform the voice call with the other electronic device using voice over internet protocol (VoIP).

* * * * *